April 5, 1966 J. D. BICK ETAL 3,244,818

MAGNETIC RECORDING AND REPRODUCING APPARATUS

Filed Aug. 8, 1962 2 Sheets-Sheet 1

INVENTORS
JOHN D. BICK &
DAVID C. PASTORE
BY Morris [signature]
Attorney

April 5, 1966 J. D. BICK ETAL 3,244,818

MAGNETIC RECORDING AND REPRODUCING APPARATUS

Filed Aug. 8, 1962 2 Sheets-Sheet 2

PRIOR ART

INVENTOR.
JOHN D. BICK &
DAVID C. PASTORE
BY Morris Rabkin
Attorney 3,244,818

MAGNETIC RECORDING AND REPRODUCING APPARATUS

John D. Bick, Moorestown, and David C. Pastore, Berlin, N.J., assignors to Radio Corporation of America, a corporation of Delaware Filed Aug. 8, 1962, Ser. No. 215,556
8 Claims. (Cl. 179—100.2)

This invention relates to magnetic recording and reproducing apparatus, and particularly to improved magnetic record transducing devices and systems for operating the same.

The present invention is especially advantageous for use in television recording and reproducing apparatus, and particularly in a television magnetic tape recorder wherein video record tracks are recorded across the tape. A feature of the present invention is to facilitate the recording of more information than heretofore possible on a given length of tape by recording the information on more closely spaced and narrower tracks than were used heretofore, without significant deterioration in system performance over the performance now known to be obtainable with television tape recorders.

In most television tape recorders, video record tracks are scanned across the tape from edge to edge by four magnetic heads mounted on a headwheel that rotates at high speed while the tape is transported from a supply reel to a takeup reel. The width and spacing of the tracks which can be recorded determines the number of tracks per unit length of tape and the speed at which the tape can be moved from the supply reel to the takeup reel for a given speed of headwheel rotation. Narrower track widths are therefore desirable.

Video recording heads which were used prior to this invention were capable of recording a track approximately 10 mils (thousands of an inch) wide. Making the tracks still more narrow presents several problems. Since the pole tips of the video head necessarily protrude into the tape and stretch the tape in the region of head-to-tape contact, it is desirable that the dimensions of the pole tips, and their protrusion into the tape, be maintained within tolerable limits for a reasonable period of time during which the head is used.

Video heads having pole tips which are of overall narrower width have not been found suitable, since the life of the pole tips depends upon the pressure of the tape against the pole tips, and therefore on the area of the pole tips in contact with the tape. Moreover, heads having narrow width pole tips (for example, reduced from 10 mils wide to 5 mils wide) present against the tape essentially a knife edge which may score or cut the tape.

Magnetic heads for recording audio signals have been suggested wherein the width of the pole tips are tapered or constricted at their signal gap defining faces. Such heads are not satisfactory for scanning video tracks for various reasons including excessive crosstalk between adjacent tracks and reduced signal amplitude which arises from their use. Recording and reproduction can occur in the region between the tapered sides of the pole tip of these heads. This recording usually causes crosstalk when adjacent tracks are reproduced. Fringe flux emanating from the tapered pole tip edges also may partially erase adjacent tracks, causing a reduction in the strength of signal recorded therein. Furthermore, known heads of the type which are constricted at their gap defining edges are also difficult to align in proper positional relationship.

Accordingly, it is an object of the present invention to provide improved magnetic recording and reprducing apparatus especially suitable for recording video information.

It is a further object of the present invention to provide improved magnetic tape recording apparatus which permits more information to be recorded per length of tape than is possible with known tape recording apparatus without deterioration of the performance or of picture quality in the case of television tape recording.

It is a still further object of the present invention to provide an improved magnetic recording head especially adapted for use in a headwheel assembly which makes possible the scanning of narrower record tracks than heretofore without significantly increased head wear or shorter head life than with heads capable only of recording much wider record tracks.

The foregoing objects, features and advantages may be obtained in a system for recording video signals on a magnetic tape by means of a rotatable headwheel having a plurality of magnetic heads mounted therein, each of which heads has pole tips adapted to protrude into and stretch the tape while scanning the tape. Each of the pole tips has opposed pole faces which define a signal gap. The width of the pole tips (i.e., their dimension in the direction of the gap) is significantly larger than the width of the desired record track (for example, two times). The pole tips are, however, tapered inwardly on at least one of the sides thereof toward their gap defining faces and have a smaller width at the gap defining faces than elsewhere along the tape contacting surface thereof. The angle of the taper measured from the plane of the gap to either tapered pole tip side is preferably forty-five degrees or greater and may be a linear, an arcuate or a combination linear-arcuate taper. Accordingly, the gap formed between the tapered sides of the pole tips increases abruptly.

A system according to the invention, for supplying recording signals to the magnetic heads includes an FM modulator having means for transmitting a band of frequencies which does not contain significant signals below a predetermined lower frequency limit. This band of frequencies is related to a range of wavelengths which are recorded on the tape in response to recording signals, having regard for the speed of movement of the head with respect to the tape. The tapered surfaces of the pole tips outside their narrow gap region are spaced from each other a distance larger than the range of wavelengths of signals recorded on the tape. Thus, the system including the head provides effective playback only in the narrow track.

The tapered surfaces of the pole tips preferably are disposed on the side of the headwheel facing the supply reel, or upstream of the tape. Whatever fringe flux is established between the tapered sides then can affect the tape only prior to recording, and does not attentuate or partially erase previously recorded tracks.

The area presented by the tape contacting surface of the pole tips is reduced somewhat in video heads embodying the invention, but this reduction is made in a manner by which the rate of wear and the consequent life of such heads are not appreciably less than the life of known heads which are capable only of recording a wider track. Since the recording tracks are narrower, the tape may be transported at slow speeds and more information can be stored thereon.

The invention itself, both as to its organization and method of operation, as well as additional objects and advantages thereof, will become more readily apparent from a reading of the following description in connection with the accompanying drawings, in which:

FIG. 1 is a diagrammatic view, partially in section, showing a headwheel and vacuum shoe arrangement for scanning record tracks transversely across a magnetic tape record;

FIG. 1*a* is a fragmentary, schematic view of the tape record showing how the record tracks are recorded thereon by means of the arrangement shown in FIG. 1.

Figure 11:
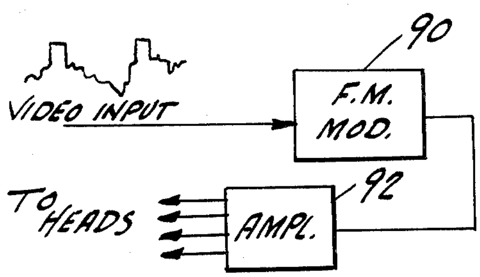
Figure 4:
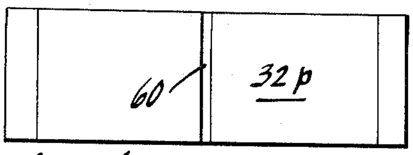
FIG. 4 is a top plan view of the pole tip portion of a video head representative of the prior art.
Figure 10:
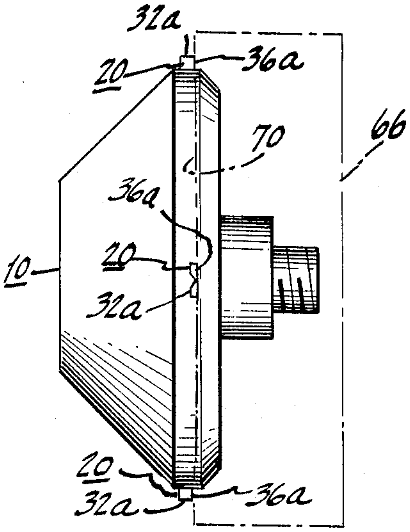
Figure 12:
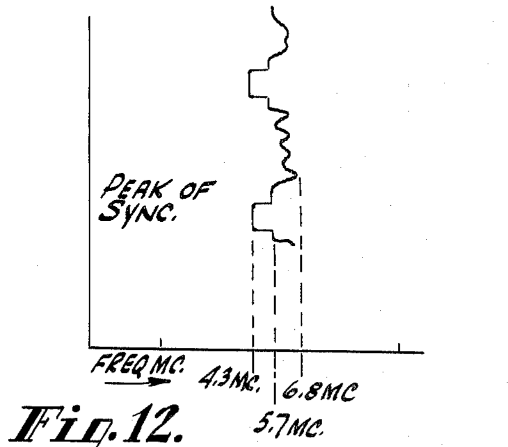

FIGS. 5–9, inclusive, are views similar to FIG. 4 showing pole tip portions of improved magnetic heads embodying the invention;

FIG. 10 is a front elevational view of a headwheel illustrating the ease of alignment of the magnetic head pole tips which embody the invention;

FIG. 11 is a block diagram of the electronic system for operating the magnetic heads embodying the invention for recording television signals; and FIG. 12 is a graph illustrating the frequency band of the signals supplied to the heads by the system of FIG. 11.

Figures 1, 1A, 2, 3:
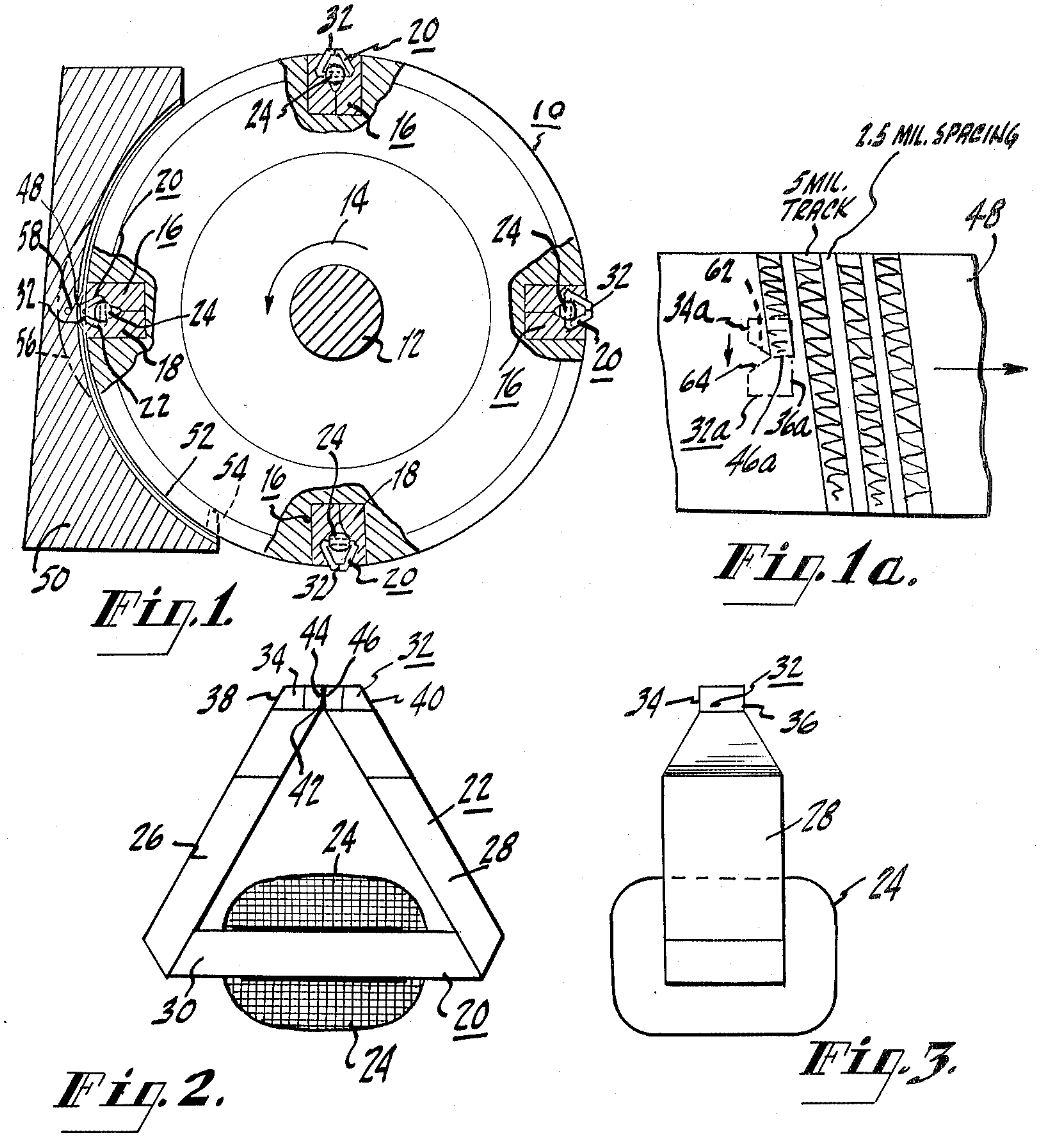
FIG. 2 is a side elevational view of the core structure of one of the magnetic heads in the headwheel of FIG. 1.
FIG. 3 is an end view of the structure shown in FIG. 2.

Referring more particularly to FIGS. 1 and 1*a*, there is shown a headwheel 10 mounted on a shaft 12. The shaft 12 may be held in bearings and coupled to a motor which is adapted to rotate the headwheel in a direction shown by the arrow 14. The headwheel 10 may be of the type used in commercial television tape recorders such as the type TR–11 sold by the Radio Corporation of America, Camden 2, New Jersey. Thus, the details of construction of the headwheel and its drive are not discussed herein. Four magnetic head assemblies 16 are mounted in capsules 18 in the headwheel. These head assemblies include magnetic heads 20 of a similar construction.

The heads 20 have core structures 22 of magnetic material. Signal coils 24 are magnetically linked to the core structures 22 by being wound around the rear core members 30 thereof. The core structures 22 include a pair of core legs 26 and 28, suitably of an aluminum-iron-silicon alloy, and a rear core member 30, suitably of ferrite, which define a magnetic circuit (see FIGS. 2 and 3).

Abutting ends of the core legs 26 and 28 are tapered inwardly and define the pole tip portion, or pole tips 32 of the magnetic head. The pole tips have, respectively, side faces 34 and 36, outer end faces 38 and 40 and inner end faces 42 and 44. The latter end faces define a signal gap 46 (see also FIG. 5). The signal gap 46 may be occupied by a gap spacer, (for example, of beryllium copper). The construction of the pole tips will be discussed hereinafter in connection with FIGS. 4–9 inclusive. The pole tips 32 extend outwardly from the periphery of the headwheel 10.

The headwheel is adapted to record a plurality of successive record tracks across a magnetic tape record 48, as shown in FIG. 1*a*. The tape is transported in a direction parallel to the axis of the headwheel 10, by means of a capstan-pressure roller tape drive mechanism, from a supply reel to a takeup reel. The tape transport mechanism (not shown) may be of the type known in the art and used in the above-mentioned type of commercial television tape recorder.

The tape 48 is bent transversely into an arcuate shape which conforms with the shape of the periphery of the headwheel 10 by means of a vacuum shoe 50. The shoe has a curved surface 52 terminating in a lip 54 which retains the lower edge of the tape 48. Vacuum chambers 56, one of which is shown in FIG. 1, are provided by spaced notches in the surface 52. Air may be exhausted from the chambers through holes 58 only one of which is shown in the drawings for the sake of simplicity. A slot 57 between the vacuum chamber notches 56 provides a channel through which the pole tips 32 travel.

The periphery of the headwheel 10 is closely adjacent to the tape 48 so that the protruding pole tips 32 of the heads 20 also protrude into the tape as these heads traverse the tape. The protrusion may be a few mils. For example, when the head is new, the protrusion may be slightly greater than 3 mils. The tape is stretched about the protruding pole tips 32.

The amount of tape stretch may vary as the pole tips wear. After a period of use, the pole tips wear away to an extent where contact with the tape no longer exists. Accordingly, it is desirable that the pole tips wear slowly so that they will maintain contact with the tape over a long, useful life. The rate at which the pole tips wear has been found to be dependant on the surface area of the pole tips.

It is believed that the wear is a function of the pressure of the tape against the pole tips. The force of the tape against the pole tips for any given protrusion into the tape is essentially constant because of the uniform vacuum in the vacuum shoe. Thus, the pressure on the pole tips will vary with the area thereof. In magnetic heads embodying the features of this invention, pole tips for scanning very narrow record tracks have tape contacting surfaces consistent with long head life.

Pole tips 32 of the type used in magnetic heads of the prior art for recording television signals are shown in FIG. 4. These pole tips have signal gaps 60 which are as wide as the pole tips. The record tracks recorded on the tape by such pole tips are therefore equal to the width of the pole tips. It is desirable to record narrower record tracks, (for example, approximately one-half the width of the record tracks which may be recorded by the pole tips shown in FIG. 4). Such narrower tracks carry more information per unit length of the magnetic tape and thereby permit the magnetic tape to be driven between the reels at approximately one-half the speed possible when magnetic heads of conventional design having pole tips such as shown in FIG. 4 are used. Reduction in the width of the pole tips shown in FIG. 4 reduces the area presented for contact with the tape. The pole tips then tend to wear away to an extent where they do not protrude sufficiently into the tape after a short period of use.

Figure 5:
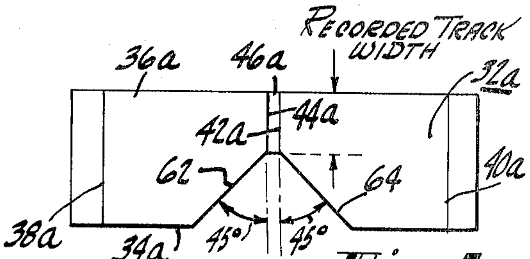

Various pole tip portions of magnetic heads embodying the invention are shown in FIGS. 5 to 9, inclusive. Like reference numerals are used to designate like parts of the embodiments illustrated in FIGS. 5 to 9, with consecutive letters of the alphabet (*a* to *e*) used, respectively, to differentiate like parts from figure to figure. An embodiment of the pole tips **32*a* is shown in FIG. 5. One of the side faces 36*a* of the pole tip 32*a* is flat across its entire length, while the other side face 34*a* is tapered inwardly, that is, indented inwardly along tapes toward the gap defining, inner end faces 42*a* and 44*a*, to define a narrowed gap region. More particularly, the indention forms tapered side surfaces 62, 64. The angle between the plane of the signal gap 46*a* (the plane in which the signal gap lies) and the tapered side surfaces 62 and 64 is illustrated as being forty-five degrees. In other words, one side face 34*a* of the pole tips 32 has a generally V-shaped notch therein defined by the tapered side surfaces 62 and 64. This notch is symmetrical about a lateral plane through the center of the gap 46*a*. The signal gap 46*a* is approximately one-half the width of the pole tips (the distance between the side faces 32*a* and 34*a*). The area presented by the pole tips 32*a* for contact with the magnetic tape has, however, been found in practice not to be reduced to an extent where the life of a magnetic head having the pole tip configuration of FIG. 5 is significantly less than the life of a magnetic head having larger area pole tips such as shown in FIG. 4. It has been found that when the core legs 26, 28** (FIG. 2) are made of the same magnetic material, (for example, an iron-aluminum-silicon alloy), the life of a head having the pole tip configuration shown in FIG. 4 or the pole tip configuration shown in FIG. 5 is substantially the same number of hours in spite of some reduction in tape contacting surface area.

The tapered surfaces 62 and 64 are located along one side face 34*a* of the pole tip, leaving the other side face 36*a* flat. The magnetic heads having pole tips 32*a* are preferably mounted in the headwheel 10 so that the flat side face 36*a* faces in the direction in which the tape is moving. In other words, the notched side 34*a* is disposed up-stream of the moving tape 48, as shown in FIG. 1*a*. If magnetic flux fringes from between the tapered surfaces 62 and 64 of the pole tip 32*a* during the recording process, this fringe flux does not affect previously recorded record tracks. The fringe flux influences only the part of the tape 48 about to be recorded on, since the tapered surfaces 62 and 64 pass over the tape before the signal gap 46*a* which records the record tracks. Any magnetization of the tape due to a previous exposure to fringe flux is effectively erased by the flux emanating from the signal gap 46*a* in the process of applying the desired recording to the record tracks.

The pole tip construction shown in FIG. 5 provides, ease of alignment of a plurality of magnetic heads in the same plane. FIG. 10 illustrates the magnetic headwheel having four magnetic heads 20 therein, the heads having pole tips 32*a* of the type shown in FIG. 5 projecting from the periphery of the wheel. These magnetic heads are preferably aligned in the same plane. This alignment, as shown in FIG. 10, may be facilitated by means of a fixture or jig 66 (shown schematically in phantom) so that the pole tip sides 36*a* are in a plane perpendicular to the axis of rotation of the headwheel. Final check on heads may be made by optical means. The heads 26 may then be fastened in position on the headwheel by molding in place.

A further advantage of the pole tip construction illustrated in FIG. 5 is that the tapered surfaces 62 and 64 diverge rapidly from each other from the narrow gap region so that their separation in the direction outwardly from the edge of the signal gap increases rapidly to an extent where effective recording of signals applied to the coil of the head does not occur. Because of the reproducing gap effect, signals having wavelengths longer than the length of the gap (the dimension of the gap in the direction of the recording) are not effectively reproduced. The wavelength of the recorded signals is, of course, dependant on the speed of movement of the head with respect to the tape. Although, the angle between the tapered surfaces 62 and 64 and the plane of the gap 46*a* is illustrated as forty-five degrees, other angles, desirably of greater than forty-five degrees, may be used.

Figure 6:
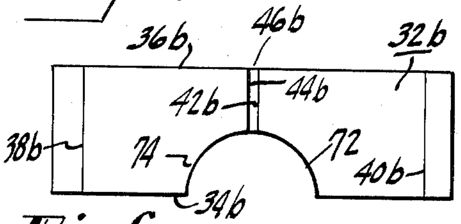

FIG. 6 shows a pole tip portion 32*b*, similar to the pole tip portion 32*a* in that one side face of the pole tip 36*b* is flat as is the side face 36*a* of the pole tips 32*a*. However, a semicircular notch is made in the other side face 34*b* of the pole tip 32*b*. The notch is symmetrical about a lateral plane through tthe center of the gap 46*b*. Quadrantal surfaces 72 and 74 of the notch respectively intersect the inner faces 42*b* and 44*b* of the pole tips 32*b* and the side face 34*a*. The width of the signal gap 46*b* is desirably one-half of the width of the pole tips 32*b*. The surfaces 72 and 74 of the semicircular notch diverge from each other even more rapidly than do the tapered surfaces 62 and 64 of FIG. 5.

Figure 7:
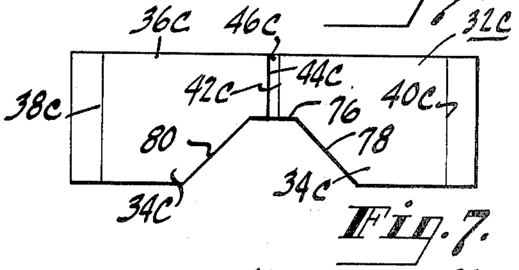

FIG. 7 illustrates a pole tip head portion 34*c* wherein only one side face 34*c* is notched. The notch is symmetrical about a lateral plane through the center of the signal gap 46*c*. The notch is defined by (1) a surface 76 which intersects the gap 46*c* and is parallel to the side faces 34*c* and 36*c*, and (2) by two tapered surfaces 78 and 80 which diverge from the surface 76 away from each other. The notch surfaces of the pole tips 34 provides surfaces 78 and 80 which are still further apart from each other than the notch surfaces 62 and 64 of the pole tip 32*a*.

Figure 8:
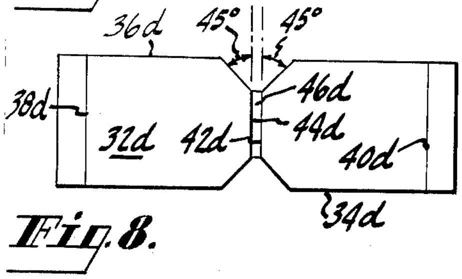

FIG. 8 shows a pole tip portion 34*d* for the heads 20 wherein both side faces 34*d* and 36*d* have V-shaped notches therein. These notches are provided by beveling the intersecting edges of the inner end faces 44*d* and 46*d* and the side faces 34*d* and 36*d* to an angle of approximately forty-five degrees. The signal gap 46*d* is thereby reduced in width to approximately one-half the width of the pole tips 32*d*. The notch in the side 34*d* is similar to the notch in the side 36*d* so that the pole tip is symmetrical about a plane extending longitudinally along the center of the pole tips 32*d* and perpendicularly to the inner faces 44*d* and 46*d* and to the outer faces 38*d* and 40*d* thereof.

Figure 9:
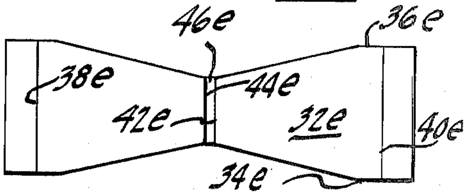

FIG. 9 shows pole tips 32*e* similar to the pole tips 32*d*. The side faces 34*e* and 36*e* of the pole tips 32*e* are tapered essentially through their entire outer end 38*c* to the outer end 40*e* length, inwardly from the outer end faces 38*e* and 40*e* to the inner end faces 42*e* and 44*e*. The angle defined by the tapered side faces 34*d* and 36*d* is a large obtuse angle so that very little flux fringes therefrom. Since these tapered sides diverge rapidly from each other, recording is closely restricted to the gap area.

The system for recording television signals by means of the headwheel 10 (FIG. 1) is shown in FIG. 11. A video input signal obtained, for example, from a television camera or a television line amplifier is applied to an FM modulator 90. This FM modulator translates the video input signal into a frequency modulated signal which deviates in frequency over a certain limited frequency range. The range of frequency deviation of the FM signal is illustrated in FIG. 12. The FM modulator may use a master oscillator which provides a carrier signal having a frequency of approximately 5.7 mc. The video signal is clamped to a predetermined D.C. level at the peak of sync (the synchronizing pulses of the TV signal) thereof so that the frequency modulated signals corresponding to peak of sync have a lower frequency limit of 4.3 mc. The television signal may produce a frequency deviation of the carrier in the opposite direction to approximately 6.8 mc. corresponding to the white level of the video signal. The output of the FM modulator 90 is applied to recording amplifiers 92. The outputs of these amplifiers 92 drive all four heads simultaneously.

By limiting the frequency deviation of the FM signal to predetermined limits (for example, 4.3 mc. to 6.8 mc.), recording does not occur between the tapered or curved sides of the notches in the pole tips 32 of the heads 20 because of the large reluctance in the notched portion of each recording gap. When the headwheel rotates at the standard speed of 14,400 rpm, the wavelength of the lowest frequency signal of the FM signals (4.3 mc.) is approximately 350 micro-inches. The length of the gap 46 is approximately 90 micro-inches. The tapered surfaces of the notches diverges rapidly from each other and are greater than 350 micro-inches apart throughout substantially their entire lateral dimensions. Thus, reproducing of signals having wavelengths of 350 micro-inches and above effectively does not occur between the tapered surfaces (e.g., surfaces 62 and 64, FIG. 5). Substantially all of the recording and reproducing occurs in the narrow track scanned by the signal gap 46*a*.

From the foregoing description, it will be apparent that there has been provided improved apparatus especially suitable for recording television signals along record tracks narrower than heretofore used without adversely limiting the life of the recording heads and the performance of the recording and play-back system. Variations and modifications of the herein described magnetic heads and recording system will undoubtedly suggest themselves to those skilled in the art. Therefore, the foregoing description should be considered illustrative and not in any limiting sense.

What is claimed is:

1. In a magnetic record device, a magnetic record transducing means including at least one magnetic head for successively scanning parallel record tracks on a magnetic record medium, said head having a core structure comprising:

(a) a pair of core legs having pole tips which have faces defining a signal gap therebetween.

(b) said pole tips having a surface for engaging said medium to successively scan said parallel record tracks with said pole tips being indented along only one side thereof at their gap-defining faces to provide a notch which faces away from previously scanned record tracks.

2. In a magnetic record device, a magnetic transducing means as claimed in claim 1 wherein said notch is in the shape of a portion of a circle.

3. In a magnetic record device, a magnetic transducing means as claimed in claim 1 wherein said notch is triangularly shaped.

4. In a magnetic record device, a magnetic transducing means as claimed in claim 1 wherein said notch is trapezoidal in shape.

5. In a system for recording on and reproducing from a magnetic tape, a magnetic tape transducing device comprising a rotatable head wheel and a plurality of magnetic heads supported by said head wheel for successively scanning parallel record tracks transverse of said tape, each of said heads comprising:

(a) a core structure including (1) a pair of core legs having pole tips which have faces defining a signal gap therebetween, (2) said pole tips having a surface for engaging said tape to successively scan said parallel record tracks, (3) said pole tips being indented along only one side thereof at their gap-defining faces to provide a notch which faces away from previously scanned record tracks, and (b) signal coil means linked to said core structure.

6. In a system for magnetic recording on and reproducing from a magnetic tape, a magnetic transducing device as claimed in claim 5 wherein said notch is in the shape of a portion of a circle.

7. In a system for magnetic recording on and reproducing from a magnetic tape, a magnetic transducing device as claimed in claim 5 wherein said notch is triangularly shaped.

8. In a system for magnetic recording on and reproducing from a magnetic tape, a magnetic transducing device as claimed in claim 5 wherein said notch is trapezoidal in shape.

References Cited by the Examiner

UNITED STATES PATENTS

| | | | |
|---|---|---|---|
| 3,046,359 | 7/1962 | Warren | 179—100.2 |
| 3,060,279 | 10/1962 | Harrison | 179—100.2 |

FOREIGN PATENTS

| | | |
|---|---|---|
| 751,405 | 6/1956 | Great Britain. |

IRVING L. SRAGOW, *Primary Examiner.*

BERNARD KONICK, *Examiner.*